（12) United States Patent
Mhatre

(10) Patent No.: US 10,007,645 B2
(45) Date of Patent: Jun. 26, 2018

(54) MODIFYING THE PRESENTATION OF A CONTENT ITEM

(75) Inventor: Amit Mhatre, Mountain View, CA (US)

(73) Assignee: Google LLC, Mountain View, CA (US)

( * ) Notice: Subject to any disclaimer, the term of this patent is extended or adjusted under 35 U.S.C. 154(b) by 690 days.

(21) Appl. No.: 13/558,290

(22) Filed: Jul. 25, 2012

(65) Prior Publication Data

US 2014/0033007 A1    Jan. 30, 2014

(51) Int. Cl.
*G06F 17/21* (2006.01)
*G06F 17/22* (2006.01)
*G06F 17/30* (2006.01)

(52) U.S. Cl.
CPC ........ *G06F 17/214* (2013.01); *G06F 17/2235* (2013.01); *G06F 17/30899* (2013.01)

(58) Field of Classification Search
CPC ............... G06F 17/214; G06F 17/2235; G06F 17/30899; G06F 17/30867; G06F 17/30528; G06F 17/30522; G06F 17/30864
USPC ......................................... 715/205, 234, 256
See application file for complete search history.

(56) References Cited

U.S. PATENT DOCUMENTS

| | | | |
|---|---|---|---|
| 7,933,818 B1 * | 4/2011 | Kumar | G06Q 30/02 705/14.25 |
| 8,131,767 B2 | 3/2012 | Brindley | |
| 8,666,835 B2 * | 3/2014 | Minnis | G06F 17/30867 705/26.1 |
| 8,676,795 B1 * | 3/2014 | Durgin | G06F 17/2715 707/730 |
| 2006/0020596 A1 * | 1/2006 | Liu | G06F 17/30867 |
| 2006/0212350 A1 * | 9/2006 | Ellis et al. | 705/14 |
| 2007/0073756 A1 * | 3/2007 | Manhas et al. | 707/101 |
| 2007/0179847 A1 * | 8/2007 | Jain | 705/14 |
| 2008/0250450 A1 * | 10/2008 | Larner et al. | 725/34 |
| 2008/0270164 A1 | 10/2008 | Kidder et al. | |
| 2009/0063264 A1 | 3/2009 | Leung | |
| 2009/0157484 A1 * | 6/2009 | Konowe | 705/10 |

(Continued)

FOREIGN PATENT DOCUMENTS

| | | | |
|---|---|---|---|
| JP | 2009104517 A | 5/2009 | |
| KR | 2009009409 A | 1/2009 | |

(Continued)

OTHER PUBLICATIONS

Alex Iskold, A guide to the contexual web—Readwrite, Dec. 22, 2008, http://readwrite.com/#!/2008/12/22/contextual_web.*

(Continued)

*Primary Examiner* — Wilson W Tsui
(74) *Attorney, Agent, or Firm* — Fish & Richardson P.C.

(57) ABSTRACT

Methods, systems, and apparatus for modifying the presentation of content item are described. In one aspect, a method includes receiving a request for supplemental content to be presented with a publication requested by a user of a client system, wherein the supplemental content comprises a body of text having a plurality of terms; in response to receiving the request, identifying one or more terms of the plurality of terms that are likely to be of interest to the user of the client system; and modifying the supplemental content to cause the one or more identified terms to appear in a presentation style that differs in appearance from other terms of the plurality of terms in the supplemental content.

22 Claims, 4 Drawing Sheets

(56) References Cited

U.S. PATENT DOCUMENTS

| | | |
|---|---|---|
| 2009/0164312 A1* | 6/2009 | Nadig .............................. 705/14 |
| 2010/0138452 A1* | 6/2010 | Henkin et al. ................. 707/803 |
| 2010/0174602 A1* | 7/2010 | Zweben et al. ............ 705/14.41 |
| 2010/0223279 A1* | 9/2010 | Scott .............................. 707/769 |
| 2011/0015996 A1 | 1/2011 | Kassoway et al. |
| 2011/0208708 A1* | 8/2011 | Liu et al. ....................... 707/706 |
| 2011/0279459 A1* | 11/2011 | Hohpe ........................... 345/467 |
| 2011/0295687 A1* | 12/2011 | Bilenko et al. ............ 705/14.54 |
| 2011/0321003 A1 | 12/2011 | Doig et al. |
| 2013/0054355 A1* | 2/2013 | Raza .................. G06Q 30/0241 |
| | | 705/14.49 |
| 2013/0191391 A1* | 7/2013 | Pradhan et al. .............. 707/737 |
| 2014/0006154 A1* | 1/2014 | Shipman et al. .......... 705/14.53 |

FOREIGN PATENT DOCUMENTS

| | | |
|---|---|---|
| KR | 2009013884 A | 2/2009 |
| KR | 2011126993 A | 11/2011 |

OTHER PUBLICATIONS

Lucash, Nathan, Modifying Advertisement Presentations; U.S. Appl. No. 11/766,837, filed Jun. 22, 2007, 39 Pages.
International Search Report and Written Opinion ; dated Nov. 12, 2013; World Intellectual Property Organization (WIPO) (International Bureau of); PCT/US2013/052083; 11 pages.

* cited by examiner

MODIFYING THE PRESENTATION OF A
CONTENT ITEM

BACKGROUND

This specification relates to modifying the presentation of content items.

The Internet provides access to a wide variety of resources, for example, content items such as video files, audio files, and image files, as well as web pages for particular subjects or articles, any or all of which may be accessible over the Internet. Access to these resources presents opportunities for other content items, such as advertisements or other supplemental content, to be provided with the resources.

Advertising is a primary technique by which providers of products or services communicate with potential purchasers in the hopes of influencing them to purchase the goods or services they are selling. Advertisements may also be used to dispense information, convey a message, or promote a cause. Advertisers generally wish to present advertisements that are likely to attract a viewer's attention, as a viewer is unlikely to be positively influenced by an advertisement that is presented in a format to which the viewer is not receptive.

SUMMARY

This specification describes technologies relating to modifying the presentation of a content item, e.g., an advertisement or other supplemental content, that may be displayed in a publication, e.g., a web page, such that certain terms in the content item appear in a presentation style that differs in appearance from other terms in the content item. The terms to be presented in the different presentation style may be identified at the time the content item is requested for presentation to a viewer and may be terms that are likely to be of interest to the viewer. Terms that are likely to be of interest to the viewer may be identified based on the terms in the content item, the viewer's activity history associated with content items or publications previously presented or searches previously performed by the viewer, or preferences of the provider of the content item. The presentation style of the identified terms may differ from the other terms in the content item in font color, font size, font style, font weight, or background color behind the identified terms, such that the identified terms are emphasized to attract the viewer's attention.

In general, one innovative aspect of the subject matter described in this specification can be implemented in methods for modifying the presentation of a content item. Methods for modifying the presentation of a content item may include receiving a request for supplemental content to be presented with a publication requested by a user of a client system, wherein the supplemental content comprises a body of text having a plurality of terms; in response to receiving the request, identifying one or more terms of the plurality of terms that are likely to be of interest to the user of the client system; and modifying the supplemental content to cause the one or more identified terms to appear in a presentation style that differs in appearance from other terms of the plurality of terms in the supplemental content. Other potential implementations include corresponding systems, apparatus, and computer programs, configured to perform the actions of the methods, encoded on computer storage devices.

These and other implementations can optionally include one or more of the following features. The publication may include a web page provided by a publisher. The supplemental content may include an advertisement. The supplemental content may further include a title and a hyperlink. The presentation style defines one or more of a font color, a font size, a font style, a font weight, or a background color behind the one or more terms. Identifying the one or more terms of the plurality of terms may include determining a type of term for each of the plurality of terms and identifying, from among the plurality of terms, one or more terms that are determined to be a noun type of term. Identifying the one or more terms of the plurality of terms may include identifying the one or more terms of the plurality of terms based on one or more interest categories of one or more publications that were presented to the user previously. Identifying the one or more terms of the plurality of terms may include identifying the one or more terms based on a plurality of search terms associated with a plurality of search queries performed by the user previously. Identifying the one or more terms of the plurality of terms may include identifying the one or more terms based on preferences of a provider of the supplemental content.

Particular implementations of the subject matter described in this specification may be implemented to realize one or more of the following potential advantages. A user may be presented with a content item to which the user is likely to be receptive and may enjoy receiving the content item, which may enhance the user's experience and may increase the likelihood that the user will interact with the content item. Providers of the content item may effectively attract a user's attention to the content item, which may lead to increased monetization performance of the content item.

Details of one or more implementations of the subject matter described in this specification are set forth in the accompanying drawings and description below. Other features, aspects, and potential advantages of the subject matter will become apparent from the description, the drawings, and the claims.

DETAILED DESCRIPTION

Various implementations described in this specification are discussed below in the context of advertisements. The technologies described in this specification may be used to modify the presentation of other content items. For example, the techniques may be used to modify the presentation of application displays, user interfaces, or web pages. Other implementations may include components different from those described herein.

Figure 1:
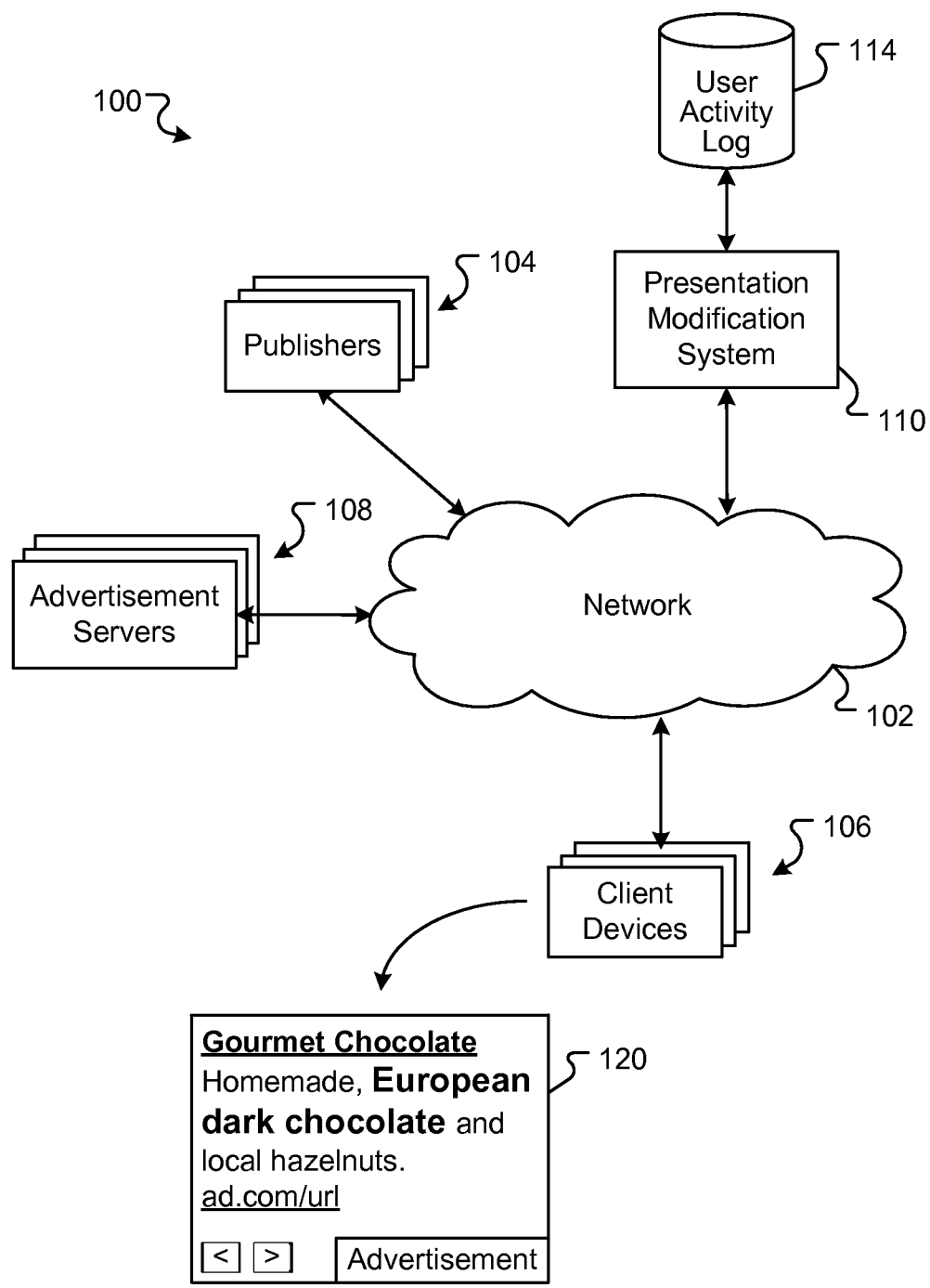
FIG. 1 is a block diagram of an example environment in which content items can be provided for presentation to a user.

FIG. 1 is a block diagram of an example environment 100 in which the presentation of a content item can be modified on a per-user basis at the time the content item is requested. A network 102, such as a local area network (LAN), wide area network (WAN), the Internet, a wired network, a wireless network, or a combination thereof, connects publishers 104, client devices 106, advertisement servers 108, and an presentation modification system 110. The environment 100 may connect many thousands of publishers 104, advertisement servers 108, and client devices 106.

A client device 106 is an electronic device that is under the control of a user and is capable of requesting and receiving publications and content items over the network 102. Example client devices 106 include personal computers, mobile communication devices, and other devices that can send and receive data over network 102. A client device 106 typically includes a user application, such as a web browser, to facilitate the sending and receiving of data over the network 102. The web browser can enable a user to display and interact with text, images, videos, music, and other information typically located on a web page at a website on the World Wide Web or a local area network.

Each publisher 104 maintains one or more publications on one or more servers. A publication is any data that can be provided by the publisher 104 over the network 102. Publications can include, for example, HTML pages (e.g., web pages), word processing documents, portable document format documents, RSS feeds, video, audio, and images. A publication can include content, such as text or images, and may include embedded information, such as meta information or hyperlinks, and/or embedded instructions, such as markup language (e.g., XML, HTML, etc.), scripts (e.g., JavaScript scripts), or applets. A publisher 104 of a publication may define content item environments, such as advertisement slots or slots for other supplemental content, in which content items, such as advertisements or other supplemental content, can be presented in the publication. These content item environments can be defined in the publication or defined for presentation with the publication.

A client device 106 sends a request to a server of a publisher 104. The request is a request for a publication, such as a web page. The request may include a unique user identifier that identifies the client device 106 that submits the request. The unique user identifier can be data from a cookie stored at the client device 106, a user account identifier if the user maintains an account with the publisher 104, or some other identifier that identifies the client device 106 or the user using the client device 106. In response to receiving a request with a user identifier, the publisher server 104 may provide the user identifier to the presentation modification system 110.

In some implementations, the user identifier is anonymized so that the user cannot be personally identified and thereby protect user privacy. For example, the users may be provided with an opportunity to opt in/out of programs or features that may collect the personal information. In addition, certain data may be anonymized in one or more ways before it is stored or used, so that personally identifiable information is removed. For example, a user's identity may be anonymized so that no personally identifiable information can be determined for the user and so that any identified user preferences or user interactions are generalized (e.g., generalized based on user demographics) rather than associated with a particular user. Finally, the information stored in the user activity log may be deleted after a predetermined period of time.

The presentation modification system 110 may dynamically modify the visual appearance of content items that are to be presented on client devices 106 at the time the content items are requested for presentation on the client devices 106. The presentation modification system 110 may modify the visual appearance of a content item to emphasize terms that are likely to be of interest to the user of the client device 106. The presentation modification system 110 may identify the terms to emphasize based on the terms in the content item, the viewer's activity history associated with content items or publications previously presented or searches previously performed by the viewer, or preferences of the provider of the content item. The presentation style of the identified terms may differ from the other terms in the content item in font color, font size, font style, font weight, or background color behind the identified terms, such that the identified terms are emphasized to attract the viewer's attention.

The presentation modification system 110 may include parameters, statistics, algorithms, profiles, or mappings that may be applied so as to manage the manner in which the appearance of content items are modified for presentation of content items on client devices 106. The presentation modification system 110 may provide instructions that define the visual appearance for a content item. Examples of such instructions include markup language (e.g., XML, HTML, etc.), scripts, applets, and the like. Although depicted as a separate entity, the presentation modification system 110 can, in some implementations, be part of an advertisement server 108 or a publisher 104.

The client device 106 receives a content item 120 and the instructions that define the visual appearance for the content item 120. The client device 106 executes the instructions, which causes the client device 106 to render the content item 120 with the identified terms emphasized for presentation to the user. The content item 120 can be displayed within a publication, such as a web page, that includes other content provided by a publisher 104. In some implementations, the publisher 104 can directly provide the content item 120 to the client device 106. For example, when an advertisement is to be included, the publisher 104 can select the advertisement and provide it with the publication.

In some implementations, one or more other components can be used to provide the content item 120. For example, the system 100 may use an advertisement server 108 to provide advertising content items for the publication. To facilitate the provisioning of advertisements, the publisher 104 can forward information to the advertisement server 108. The advertisement server 108 uses the received information to select advertisements according to preprogrammed selection routines. For example, the advertisement server 108 can make a selection in a library of advertisements based on a category of the publisher 104, the content of the publication, one or more keywords, or user profile data. The advertisement server 108 then selects and provides the advertisements for display in the publication.

The presentation modification system 110 may monitor the user's activity with respect to content items, publications, and search queries. The presentation modification system 110 may analyze the user's activity for trends. For example, the presentation modification system 110 may monitor how the user responds to content items, such as click through rates and conversion rates. As another example, the presentation modification system 110 may monitor the user's browsing history or search history to determine the user's interests. The presentation modification system 110 may store information describing the user's activities in a user activity log 114 and may identify terms to emphasize in a content item based on user records stored in the user activity log 114.

One activity that can be monitored by the content layout system is a click event. A click event is a user selection of a content item, such as an advertisement, in the resource 120. In some implementations, when a user selects an advertisement by clicking on it, the browser directs the user to a particular web page associated with the selected advertisement, such as a landing page. Based on the click events, the content layout system 110 determines click through rates associated with content items provided with the resource 120, and also click through rates for particular layouts.

Another activity that can be monitored is a conversion event. A conversion event occurs when a user performs a desired action after being presented with the resource 120 (or a landing page for a selected content item). For example, a conversion event may be a user consummating a purchase, or performing other similar activities such as reviewing information presented by an advertiser, after viewing an advertisement. As another example, a conversion event may be a user redeeming a coupon obtained via presentation of a coupon format advertisement. A conversion event is thus any appropriate measurable or observable user action following a selection of content item, such as spending a sufficient amount of time viewing a landing page or a web site, selecting one or more links to other documents within the landing page or web site, registering on a web page, subscribing to a newsletter, or downloading software. Based on the conversion events, the content layout system 110 may determine conversion rates associated with content items provided with the resource 120, and also conversion rates for particular layouts.

As yet another example of an activity that can be monitored is a bounce event. A bounce event occurs when a user only views a single web page on a website and leaves the website without visiting any other pages before a specified session timeout occurs. Based on the bounce events, the content layout system 110 determines bounce rates associated with the resource 120, and also bounce rates for particular layouts.

The user activity log 114 stores identifiers that identify the client devices 106 or the users using the client devices 106, and activity history associated with each of the identifiers. Activity history includes, for example, the publications and content items that were requested by the user, the time spent viewing the publications, categories of the publications and content items, click through rates, conversion rates, bounce rates, or other interaction for the user associated with publications or content items, browsing history, search history, and the like. The user activity log 114 may store other information useful to the modification of the presentation of content items, such as user profiles and preferences, client device information, including device limitations that would preclude the provisioning of a particular presentation style, and publisher or advertiser information. As described above, the data in the activity log 114 are anonymized so as to protect the users' privacy.

When using the user's activity history to modify the presentation of a content item, the presentation modification system 110 may use any suitable statistical measure or technique to identify the terms and modify the presentation style of the terms. For example, thresholds, linear combinations with appropriate weighting coefficients, standard or moving (such as one-week, two-week, one-month, two-month, six-month, etc.) averages, or any other appropriate statistical technique may be used.

Figure 2:
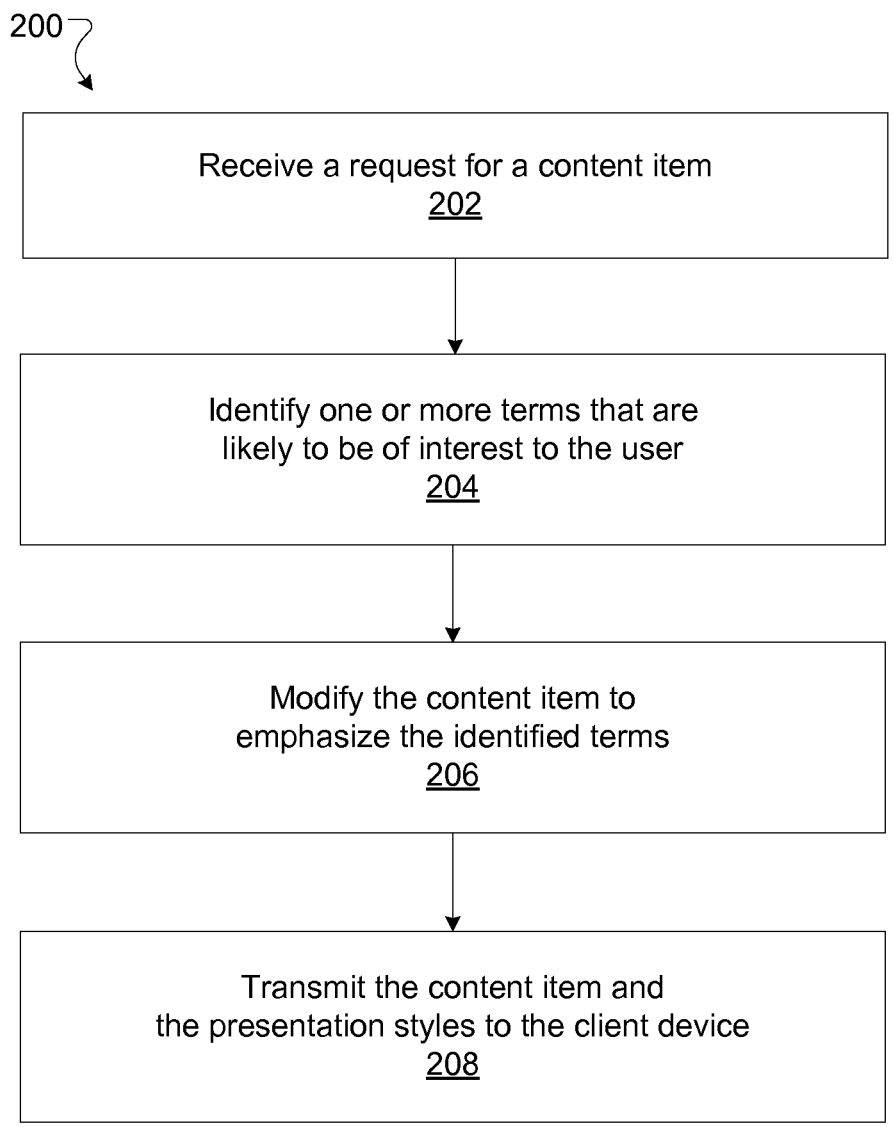
FIG. 2 is a flowchart of an example process for modifying the presentation of a content item.

FIG. 2 is a flowchart of an example process 200 for modifying the presentation of a content item, such as an advertisement. The process 200 may be performed by a presentation modification system that includes one or more computers, such as the presentation modification system 110 of FIG. 1.

The process 200 begins with the presentation modification system receiving a request from a client device, a publisher, or an advertisement server to serve a content item, such as an advertisement or other supplemental content, to be displayed within a publication, such as a web page, requested by a user of the client device (202). In some implementations, the request may include a unique user identifier that identifies the client device that submits the request. The requested content item may include a title, a body of text, and a hyperlink to a publication related to the content item. In some implementations, the requested content item may include other text, graphics, images, video, audio, or other types of media.

In response to receiving the request, the presentation modification system identifies one or more terms in the content item that are likely to be of interest to the user of the client device (204). The terms of potential interest may be terms included in the body of text of the content item. The identification of the terms can be done by any of a variety of appropriate identification methods.

In some implementations, the presentation modification system may identify terms of potential interest based on the terms in the content item. For example, the presentation modification system may analyze each term in the body of text of the content item to determine the type of term. The type of term may be, for example, a proper noun, a noun, a verb, an adverb, a number, a symbol, or the like. The presentation modification system may determine whether a term is part of a phrase that includes two or more terms. The presentation modification system may determine whether a term is associated with an entity, such as a person, place, organization, company, brand, or the like. Based on the analysis of the terms in the body of text of the content item, the presentation modification system may identify one or more terms that are categorized as, for example, proper nouns or entities and that may be of potential interest to the user.

In other implementations, the presentation modification system may use the user identifier included in the request for the content item to access information describing the user's activities associated with content items or publications previously presented to the user. Based on the user's activities, the presentation modification system may identify terms of potential interest in the requested content item. For example, the content items or publications that were previously presented to the user may be classified into categories. The presentation modification system may identify the categories that are likely to be of interest to the user by analyzing the click through rates, conversion rates, bounce rates, or time spent viewing publications or content items associated with the categories. The presentation modification system may identify terms in the requested content item that are associated with the categories of content items or publications that are likely to be of interest to the user.

In still other implementations, the presentation modification system may identify terms of potential interest based on the user's search history, for example, over a number of searches or over a period of time. For example, the user's record may include search terms associated with the five most recent search queries performed by the user or associated with the search queries performed over the last five days. The presentation modification system may identify terms in the requested content item that are associated with the search terms stored in the user's record.

In another implementation, the presentation modification system may identify terms of potential interest based on preferences of a provider of the content item. For example, a provider of the requested content item may specify terms that are likely to be of interest to a user and that are to be emphasized when presenting the content item to a user.

The presentation modification system modifies the content item to emphasize the identified terms (206). The identified terms may appear in a presentation style that differs in appearance from other terms in the body of text of the content item. In some implementations, to modify the content item, the presentation modification system may determine the default presentation style for the body of text and select a presentation style for the identified terms that is different than the default presentation style. In other implementations, the presentation modification system may select a first presentation style for the identified terms and a second presentation style for the other terms in the body of text that is different than the first presentation style.

The presentation style of the identified terms may differ from the other terms in the content item in font color, font size, font style, font weight, or background color behind the identified terms, such that the identified terms are emphasized to attract the viewer's attention. For example, the identified terms may be presented in all capital letters, in a bold face type, with an underline, in a bright color, with a text shadow, with a glowing effect, in front of a different background color than the rest of the advertisement, or in any suitable manner that emphasizes the identified terms.

The presentation modification system transmits the content item and the presentation styles to the client device for rendering along with the requested publication (208). The presentation modification system may provide instructions that define the visual appearance, e.g., the presentation styles, for the content item. Examples of such instructions include markup language (e.g., XML, HTML, etc.), scripts, applets, and the like. When the client device receives the content item and the instructions, the client device executes the instructions, which causes the client device to render the content item with the identified terms emphasized for presentation to the user. The content item can be displayed within a publication, such as a web page, that includes other content provided by a publisher.

After providing the content item, the presentation modification system may monitor the user's activity associated with the content item. For example, the presentation modification system may receive reporting data that describes actions taken by the user with respect to the content item. The presentation modification system may analyze the user's activity for trends. Based on the trends, the presentation modification system may identify categories of content items or publications that are likely to be of interest to the user. The presentation modification system may determine presentation styles that are likely to attract a user's attention. The presentation modification system may store information associated with the user's activities.

Figure 3:
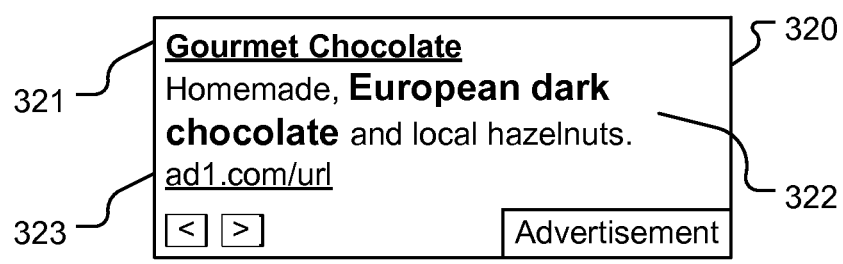
FIGS. 3 and 4 are example content items where terms that are likely to be of interest to a user are emphasized.
Figure 4:
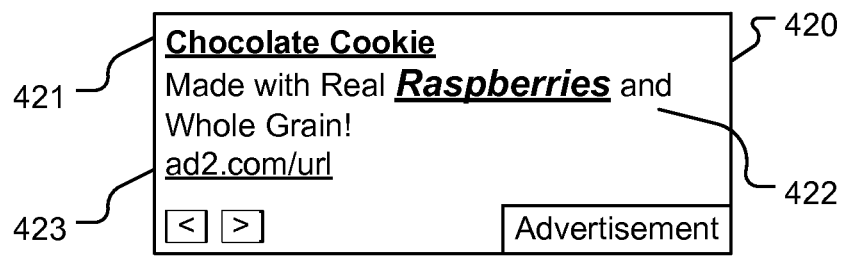

FIGS. 3 and 4 are example content items, e.g., advertisements, where terms in the body of text of the advertisement that are likely to be of interest to a user are emphasized. A content item, e.g., content item 320 in FIG. 3, may include a title 321, a body of text 322, and a uniform resource locator (URL) 323. A content item may include one or more components for different tags or indicators (e.g., HTML tags, or XHTML, cHTML, or WML format components). The components may be used to determine how to display the content item. The presentation modification system may modify the presentation of a content item by changing the font color, font size, font style, font weight, or background color behind the identified terms in the body of text, such that the identified terms are emphasized to attract the viewer's attention FIG. 3 is a content item 320 presented to a user. The presentation modification system has identified the phrase "European dark chocolate" in the body of text 322 as a phrase that is likely to be of interest to the user. The presentation modification system modifies the content item 320 to cause the phrase "European dark chocolate" to appear in bold face type and in a larger font size than the other text in the body of text 322.

FIG. 4 is a content item 420 presented to a user. The presentation modification system has identified the term "Raspberries" in the body of text 422 as a term that is likely to be of interest to the user. The presentation modification system modifies the content item 420 to cause the term "Raspberries" to appear in underlined, bold face, and italic type and in a larger font size than the other text in the body of text 422.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

Figure 5:
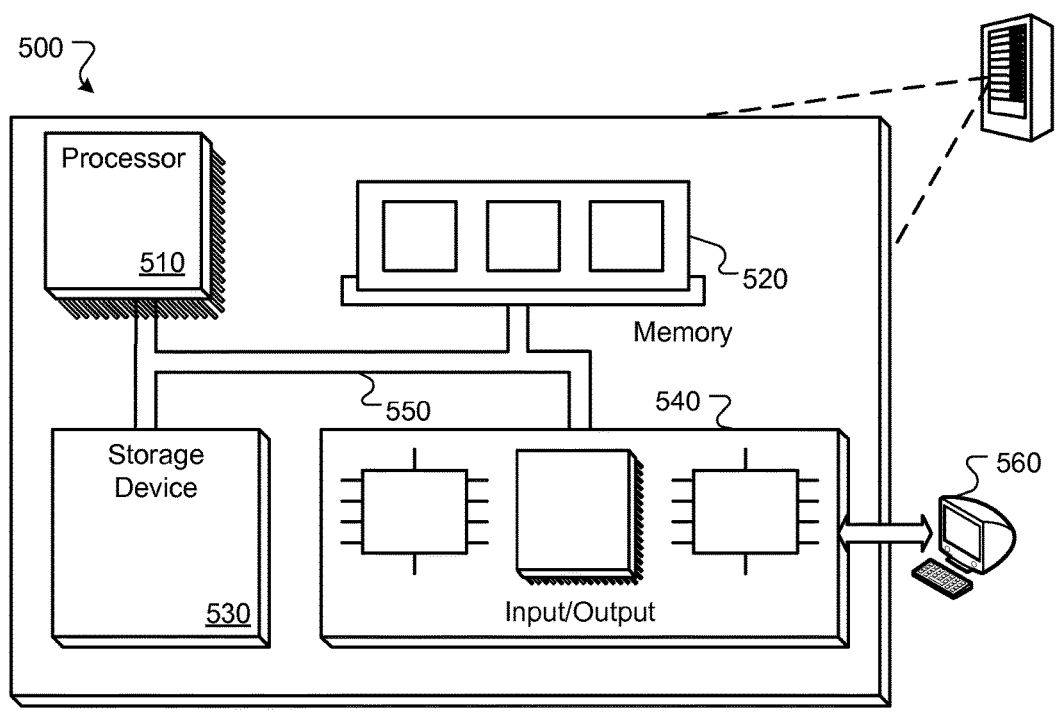
FIG. 5 is a block diagram of a programmable processing system.

An example of one such type of computer is shown in FIG. 5, which shows a block diagram of a programmable processing system (system). The system 500 that can be utilized to implement the systems and methods described herein. The architecture of the system 500 can, for example, be used to implement a computer client, a computer server, or some other computer device.

The system 500 includes a processor 510, a memory 520, a storage device 530, and an input/output device 540. Each of the components 510, 520, 530, and 540 can, for example, be interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can, for example, include a hard disk device, an optical disk device, or some other large capacity storage device.

The input/output device 540 provides input/output operations for the system 500. In one implementation, the input/output device 540 can include one or more of a network interface device, e.g., an Ethernet card, a serial communication device, e.g., and RS-232 port, and/or a wireless interface device, e.g., an 802.11 card. In another implementation, the input/output device can include driver devices configured to receive input data and send output data to other input/output devices, e.g., keyboard, printer and display devices 560.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by a data processing apparatus, the method comprising:
   storing an activity history of a user using a client system, the activity history including at least one of click through rates, conversion rates, and bounce rates associated with presentation styles of content items and publications previously presented to the user on the client system;
   classifying, by the data processing apparatus, the content items and publications previously presented to the user into categories through analysis of text within the content items and publications that were previously presented;
   selecting, from among the categories, a category of interest based on the stored activity history that includes the at least one of click through rates, conversion rates, and bounce rates associated with presentation styles of the content items and publications previously presented to the user on the client system;
   receiving, by the data processing apparatus, a request for supplemental content to be presented with a publication requested by the user of the client system, wherein the supplemental content comprises a body of text having a plurality of terms, and wherein the publication includes one or more slots that reference the supplemental content;
   determining that one or more terms of the body of text having the plurality of terms comprise a specified type of term or a phrase;
   identifying that the one or more terms comprising the specified type of term or the phrase are associated with the category of interest selected from among the categories into which the content items and publications, that are previously presented to the user and for which the at least one of click through rates, conversion rates, and bounce rates are stored in the activity history, are classified;
   identifying a particular presentation style by determining a default presentation style for the determined one or more terms of the body of text having the plurality of terms;
   selecting the particular presentation style for the determined one or more terms that is different from the default presentation style;
   modifying the supplemental content referenced by the one or more slots to cause the one or more terms identified as being associated with the selected category of interest to appear in the identified particular presentation style such that the identified one or more terms differ in appearance from other terms of the plurality of terms in the supplemental content; and
   providing the requested publication with the one or more slots, wherein the one or more slots comprise the modified supplemental content.

2. The method of claim 1, wherein the publication comprises a web page provided by a publisher.

3. The method of claim 1, wherein the supplemental content comprises an advertisement.

4. The method of claim 1, wherein the supplemental content further comprises a title and a hyperlink.

5. The method of claim 1, wherein the particular presentation style defines one or more of a font color, a font size, a font style, a font weight, or a background color behind the one or more terms.

6. The method of claim 1, further comprising:
   determining a type of term for each of the plurality of terms; and
   identifying, from among the plurality of terms, one or more terms that are determined to be a noun type of term.

7. The method of claim 1, further comprising: identifying one or more additional terms of the plurality of terms based on one or more publications that were presented to the user previously and that are associated with the category of interest.

8. The method of claim 1, further comprising:
   identifying one or more additional terms based on a plurality of search terms associated with a plurality of search queries performed by the user previously.

9. The method of claim 1, further comprising:
   identifying one or more additional terms based on preferences of a provider of the supplemental content.

10. A non-transitory computer-readable storage medium encoded with instructions that when executed by a data processing device cause the data processing device to perform operations comprising:
    storing an activity history of a user using a client system, the activity history including at least one of click through rates, conversion rates, and bounce rates associated with presentation styles of content items and publications previously presented to the user on the client system;
    classifying, by the data processing device, the content items and publications previously presented to the user into categories through analysis of text within the content items and publications that were previously presented;
    selecting, from among the categories, a category of interest based on the stored activity history that includes the at least one of click through rates, conversion rates, and bounce rates associated with presentation styles of the content items and publications previously presented to the user on the client system;

receiving, by the data processing device, a request for supplemental content to be presented with a publication requested by the user of the client system, wherein the supplemental content comprises a body of text having a plurality of terms, and wherein the publication includes one or more slots that reference the supplemental content;

determining that one or more terms of the body of text having the plurality of terms comprise a specified type of term or a phrase;

identifying that the one or more terms comprising the specified type of term or the phrase are associated with the category of interest selected from among the categories into which the content items and publications that are previously presented to the user and for which the at least one of click through rates, conversion rates, and bounce rates are stored in the activity history are classified;

identifying a particular presentation style by determining a default presentation style for the determined one or more terms of the body of text having the plurality of terms;

selecting the particular presentation style for the determined one or more terms that is different from the default presentation style;

modifying the supplemental content referenced by the one or more slots to cause the one or more terms identified as being associated with the selected category of interest to appear in the identified particular presentation style such that the identified one or more terms differ in appearance from other terms of the plurality of terms in the supplemental content; and providing the requested publication with the one or more slots, wherein the one or more slots comprise the modified supplemental content.

11. The computer-readable storage medium of claim 10, wherein the publication comprises a web page provided by a publisher.

12. The computer-readable storage medium of claim 10, wherein the supplemental content comprises an advertisement.

13. The computer-readable storage medium of claim 10, wherein the supplemental content further comprises a title and a hyperlink.

14. The computer-readable storage medium of claim 10, wherein the particular presentation style defines one or more of a font color, a font size, a font style, a font weight, or a background color behind the one or more terms.

15. The computer-readable storage medium of claim 10, further comprising:
  determining a type of term for each of the plurality of terms; and
  identifying, from among the plurality of terms, one or more terms that are determined to be a noun type of term.

16. The computer-readable storage medium of claim 10, further comprising:
  identifying one or more additional terms of the plurality of terms based on one or more publications that were presented to the user previously and that are associated with the category of interest.

17. The computer-readable storage medium of claim 10, further comprising: identifying one or more additional terms based on a plurality of search terms associated with a plurality of search queries performed by the user previously.

18. The computer-readable storage medium of claim 10, further comprising: identifying one or more additional terms based on preferences of a provider of the supplemental content.

19. A system, comprising:
  a data processing device; and
  a non-transitory computer-readable storage medium encoded with instructions that when executed by the data processing device cause the data processing device to perform operations comprising:
    storing an activity history of a user using a client system, the activity history including at least one of click through rates, conversion rates, and bounce rates associated with presentation styles of content items and publications previously presented to the user on the client system;
    classifying, by the data processing device, the content items and publications previously presented to the user into categories through analysis of text within the content items and publications that were previously presented;
    selecting, from among the categories, a category of interest based on the stored activity history that includes the at least one of click through rates, conversion rates, and bounce rates associated with presentation styles of the content items and publications previously presented to the user on the client system;
    receiving a request for supplemental content to be presented with a publication requested by the user of the client system, wherein the supplemental content comprises a body of text having a plurality of terms, and wherein the publication includes one or more slots that reference the supplemental content;
    determining that one or more terms of the body of text having the plurality of terms comprise a specified type of term or a phrase;
    identifying that the one or more terms comprising the specified type of term or the phrase are associated with the category of interest selected from among the categories into which the content items and publications that are previously presented to the user and for which the at least one of click through rates, conversion rates, and bounce rates are stored in the activity history are classified;
    identifying a particular presentation style by determining a default presentation style for the determined one or more terms of the body of text having the plurality of terms;
    selecting the particular presentation style for the determined one or more terms that is different from the default presentation style;
    modifying the supplemental content referenced by the one or more slots to cause the one or more terms identified as being associated with the selected category of interest to appear in the identified particular presentation style such that the identified one or more terms differ in appearance from other terms of the plurality of terms in the supplemental content; and
    providing the requested publication with the one or more slots, wherein the one or more slots comprise the modified supplemental content.

20. The system of claim 19, wherein the operations further comprise:
  determining a type of term for each of the plurality of terms; and identifying, from among the plurality of terms, one or more terms that are determined to be a noun type of term.

21. The system of claim 19, wherein the operations further comprise:
   identifying one or more additional terms of the plurality of terms based on one or more publications that were presented to the user previously and that are associated with the category of interest.

22. The system of claim 19, wherein the operations further comprise:
   identifying one or more additional terms based on a plurality of search terms associated with a plurality of search queries performed by the user previously.

* * * * *